A. L. PUTNAM.
METALLIC VEHICLE WHEEL.
APPLICATION FILED JAN. 24, 1916.
1,286,191.
Patented Nov. 26, 1918
2 SHEETS—SHEET 2.
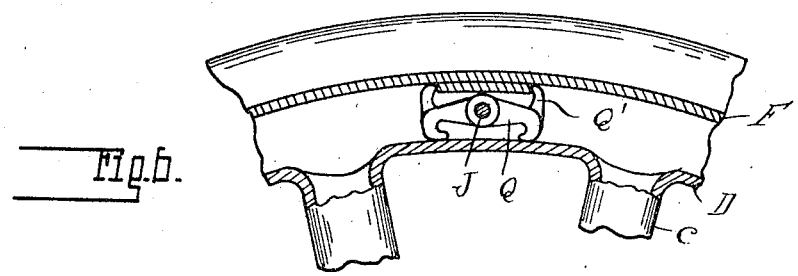
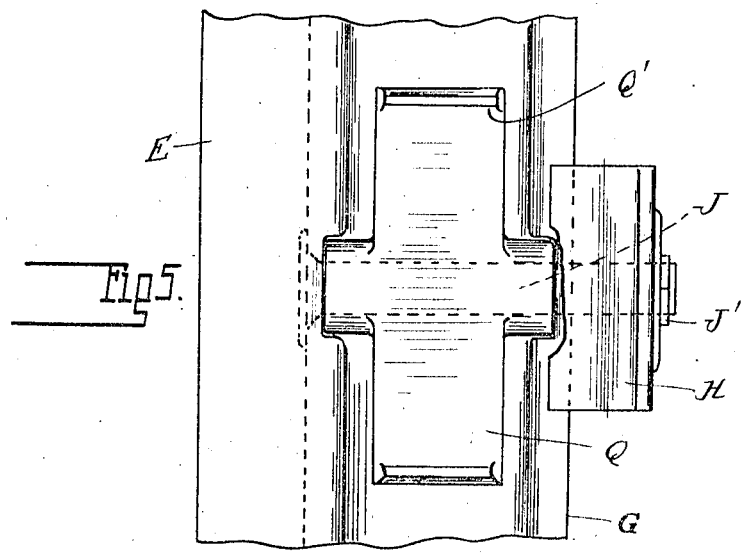
Inventor
Alden L. Putnam
By Whittemore, Hulbert & Whittemore
Attorneys

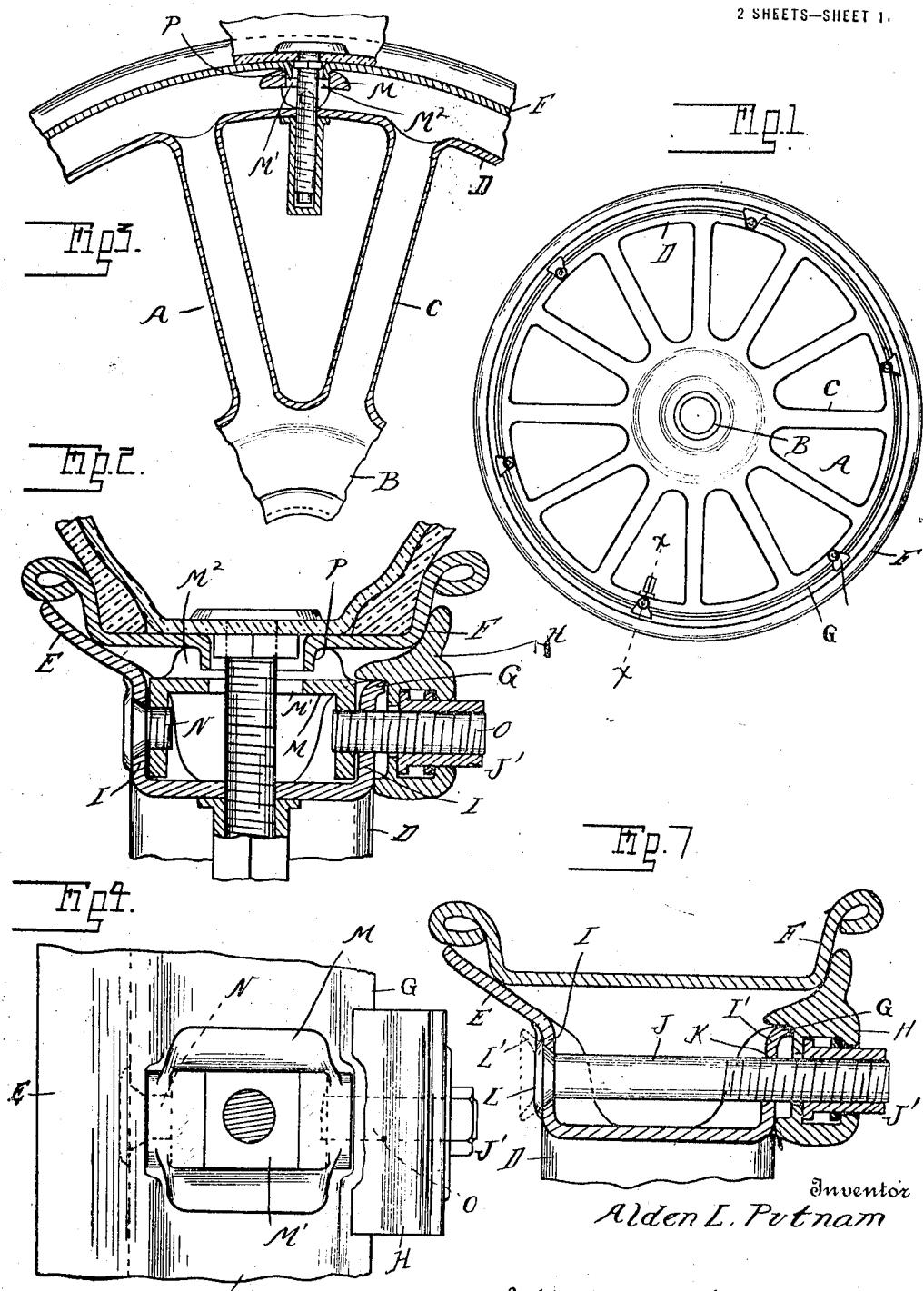

UNITED STATES PATENT OFFICE.

ALDEN L. PUTNAM, OF DETROIT, MICHIGAN, ASSIGNOR TO DETROIT PRESSED STEEL COMPANY, OF DETROIT, MICHIGAN, A CORPORATION OF MICHIGAN.

METALLIC VEHICLE-WHEEL.

1,286,191.  Specification of Letters Patent.  Patented Nov. 26, 1918.

Application filed January 24, 1916. Serial No. 73,851.

*To all whom it may concern:*

Be it known that I, ALDEN L. PUTNAM, a citizen of the United States of America, residing at Detroit, in the county of Wayne and State of Michigan, have invented certain new and useful Improvements in Metallic Vehicle-Wheels, of which the following is a specification, reference being had therein to the accompanying drawings.

The invention relates to vehicle wheels of that type in which the rim is of channel section, and it is the object of the invention to provide means for attachment thereto of a standard construction of demountable rim designed for attachment to wooden wheels. In the present state of the art one method of attaching demountable rims to wheels having wooden fellies is by wedge bearings which are adjustably clamped to the felly by bolts extending transversely therethrough. With such construction the demountable rim is held from rotative adjustment by an anchoring bearing thereon engaging a coöperating bearing on the felly and which prevents the cutting off of the air valve and filler tube of the tire by creeping of the rim. Where a channel rim is substituted for the wooden felly other means must be provided for securing and anchoring the demountable rim, and to this end I have devised the following construction.

In the drawings:

Figure 1 is an elevation of the wheel showing the demountable rim secured thereto;

Fig. 2 is a cross section therethrough, on line *x—x* of Fig. 1;

Fig. 3 is a longitudinal section;

Fig. 4 is a plan view of a portion of the permanent rim with the demountable rim detached, showing an arrangement in which the anchoring bearing on the rim is adjacent to the air valve tube;

Figs. 5 and 6 are respectively a plan and longitudinal section showing an anchoring construction not associated with the air valve tube; and Fig. 7 is a section showing the manner of detachably engaging the wedge clamping bolt.

A is a metallic wheel which as shown is formed of complementary sheet-metal sections having the hub B, spokes C and rim D integral. The rim is formed of a channel section, one flange E thereof being adapted to form a retaining bearing for a standard construction of demountable rim, such as F, and the opposite flange G forming a bearing for the wedge member H which clamps and secures said rim F.

The bolt J engages an apertured embossed portion I on the channel rim extending through the channel and projecting through an opposite apertured embossed portion I' for engagement with the wedge H and clamping nut J'. With wooden fellies the bolt is held from turning by longitudinal ribs thereon which press into the wood. Such a construction is not suitable for use with metallic rims, but it is essential to normally hold the bolt from turning and at the same time to permit of detachment when necessary. This I accomplish by engaging the threaded portion of the bolt with a correspondingly threaded aperture K in the embossed portion I' and providing the head L of the bolt with a bendable flange L'. When the bolt is engaged with the bearing the flange L' may be bent down so as to interlock with the flange E of the rim and prevent turning of the same, but whenever it is necessary to remove the bolt, by placing a wrench or other turning tool thereon it may be unscrewed, thereby bending back the flange L'.

To anchor the demountable rim from creeping one of the bolts J has sleeved thereon an anchoring member for engaging the coöperating anchoring shoulder on the rim. With certain constructions of demountable rims this anchoring shoulder is adjacent to the aperture of the valve tube of the tire, and for such constructions I employ the structure shown in Figs. 2 to 4. This comprises an insert M placed in the channel of the wheel rim, which is apertured at M' for the passage of the valve tube, said aperture being in alinement with an aperture in the rim. The insert M is secured by a bolt or rivet N engaging the embossed portion I, and has a projecting threaded stud O passing through the opposite embossed portion I' for engaging the wedge H and nut J'. The member M is also provided with a recess M² for receiving the locking lug P on the demountable rim and thereby holding said rim from creeping.

With the construction shown in Figs. 5 and 6, the anchoring member Q is not associated with the valve tube but is sleeved upon one of the bolts J and is provided with locking shoulders Q' for engaging the cooperating locking shoulders on the demountable rim.

With the construction as described, any of the standard constructions of demountable rim applicable to wooden wheels is equally applicable to the metallic wheel, it being merely necessary to select a locking member corresponding to the particular rim used. The rim is attached or detached in the usual way, by loosening the nuts so as to permit turning of the wedge bearings out of the path of the demountable rim, and after the latter is in place re-turning said bearings and tightening the nuts. As the point of bearing of the wedge is intermediate spokes the resiliency of the channeled rim will cushion the shocks in a similar manner to the action of a wooden wheel.

What I claim as my invention is:—

1. In a wheel, the combination with a channeled rim having an embossed portion therein, of a member in the recess formed by said embossed portion forming an anchor for a demountable rim, a clamping device for said demountable rim, and a common bolt for securing said clamping device and anchor.

2. In a wheel, the combination with integral pressed sheet-metal spoke and channel rim sections, of a demountable rim for engaging said channel rim, a clamping device for said demountable rim, an anchor within the channel of the rim apertured for the passage of the air valve tube of the tire and having a locking engagement with said demountable rim, and a common bolt for securing said clamping device and anchor.

3. In a wheel, the combination with a channeled rim having an embossed portion therein, of a member in the recess formed by said embossed portion forming an anchor for a demountable rim, and means for securing said anchor to said channeled rim.

4. In a wheel, the combination with a channeled rim having an embossed portion therein, of a member in the recess formed by said embossed portion forming an anchor for a demountable rim, a clamping device for said demountable rim, and a common means engaging said anchor and clamping device with the channeled rim.

5. In a wheel, the combination with a channeled rim, of a demountable rim for detachably engaging the same, a member rigidly mounted in the channel of the rim, apertured for the valve stem, projections from said member at each side of said aperture and a member projecting from the demountable rim engaged between said projections.

6. In a wheel, the combination with a channeled rim, of a demountable rim for detachably engaging the same, said channeled rim having an embossed portion, an anchorage member having flanges engaging said embossed portion and formed with an aperture for the valve stem, projections from said member at each side of said aperture, and an annular flange projecting from the demountable rim and circling an aperture therein for the valve stem and engaging between said projections.

7. In a wheel, the combination with a channeled rim, of a demountable rim for detachably engaging the same, an anchorage member within the channeled rim formed with circumferentially spaced outstanding projections, a clamping bolt for said demountable rim engaging and securing said anchorage member, and a coacting anchorage member secured to the demountable rim and engageable between said outstanding projections.

In testimony whereof I affix my signature.

ALDEN L. PUTNAM.